United States Patent
Lin et al.

(10) Patent No.: US 11,937,254 B2
(45) Date of Patent: Mar. 19, 2024

(54) WIRELESS COMMUNCATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yanan Lin, Dongguan (CN); Weijie Xu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 498 days.

(21) Appl. No.: 17/207,531

(22) Filed: Mar. 19, 2021

(65) Prior Publication Data

US 2021/0212103 A1 Jul. 8, 2021

Related U.S. Application Data

(63) Continuation of application No. PCT/CN2019/072431, filed on Jan. 18, 2019.

(51) Int. Cl.
*H04W 72/23* (2023.01)
*H04W 52/02* (2009.01)
*H04W 72/0453* (2023.01)

(52) U.S. Cl.
CPC ....... *H04W 72/23* (2023.01); *H04W 72/0453* (2013.01); *H04W 52/0212* (2013.01)

(58) Field of Classification Search
CPC .............. H04W 72/23; H04W 72/0453; H04W 52/0212; Y02D 30/70
See application file for complete search history.

(56) References Cited

U.S. PATENT DOCUMENTS

| 2012/0327910 | A1* | 12/2012 | Dalsgaard ............. H04L 5/0098 370/335 |
| 2015/0296542 | A1* | 10/2015 | Heo .................. H04W 74/0833 370/329 |
| 2019/0357238 | A1* | 11/2019 | Zhou ..................... H04W 72/23 |
| 2020/0092073 | A1* | 3/2020 | Papasakellariou .... H04L 5/0053 |

(Continued)

FOREIGN PATENT DOCUMENTS

| CN | 102088433 A | 6/2011 |
| CN | 102149208 A | 8/2011 |
| CN | 102238747 A | 11/2011 |

(Continued)

OTHER PUBLICATIONS

Second Office Action issued in corresponding Chinese Application No. 202011590041.2, dated Aug. 25, 2022.

(Continued)

*Primary Examiner* — Mehmood B. Khan
(74) *Attorney, Agent, or Firm* — BAYES PLLC

(57) ABSTRACT

Implementations of the present disclosure provide a wireless communication method, a terminal device, and a network device. In the method, a terminal device detects first Downlink Control Information (DCI) in a Physical Downlink Control Channel (PDCCH) search space corresponding to a first carrier. A first information field in the first DCI indicates a second carrier. The terminal device activates or deactivates the second carrier in response to the first DCI.

11 Claims, 6 Drawing Sheets

(56) References Cited

U.S. PATENT DOCUMENTS

2021/0266902 A1\* 8/2021 Takeda .............. H04L 27/26025

FOREIGN PATENT DOCUMENTS

| CN | 102783229 A | 11/2012 | | |
|---|---|---|---|---|
| CN | 109089316 A | 12/2018 | | |
| WO | 2011/135916 A1 | 11/2011 | | |
| WO | WO-2012123070 A1 \* | 9/2012 | ........... | H04B 7/2606 |

OTHER PUBLICATIONS

Third Office Action issued in corresponding Chinese Application No. 202011590041.2, dated Nov. 8, 2022.
WO, International Search Report and Written Opinion, PCT/CN2019/072431, dated Oct. 15, 2019, 28 pages.
PCT Written Opinion of the International Searching Authority issued in corresponding International Application No. PCT/CN2019/072431, dated Oct. 15, 2019, 7 pages.
First Office Action issued in corresponding Chinese Application No. 202011590041.2, dated Jun. 8, 2022, 18 pages.
Notice of Priority Review of Patent Application issued in corresponding Chinese Application No. 202011590041.2, dated May 19, 2022, 6 pages.
3GPP TS 38.213 V15.10.0 (Jun. 2020); Technical Specification Group Radio Access Network; NR; Physical layer procedures for control (Release 15), 109 pages.

\* cited by examiner

WIRELESS COMMUNCATION METHOD, TERMINAL DEVICE, AND NETWORK DEVICE

CROSS-REFERENCE TO RELATED APPLICATIONS

This application is a continuation application of International Application No. PCT/CN2019/072431, filed Jan. 18, 2019, the entire contents of which are incorporated herein by reference.

BACKGROUND

Implementations of the present disclosure generally relate to communication technologies, and more particularly, to wireless communication methods, terminal devices, and network devices.

Carrier Aggregation (CA) technology can enable a terminal device to use multiple component carriers to send and receive data at the same time, which increases the data transmission rate and improves system working efficiency. In the CA system, activation and deactivation of a carrier can be achieved through Media Access Control Control Element (MAC CE) signaling or based on timer control. However, in the carrier activation and deactivation method based on the MAC CE mode or the timer control, the signaling takes effect with a certain delay, and the carrier activation and deactivation process takes a long time, which is not conducive to reducing terminal power consumption.

SUMMARY

Implementations of the present disclosure provide a wireless communication method, a terminal device and a network device.

According to a first aspect, there is provided a wireless communication method, including detecting, by a terminal device, first Downlink Control Information (DCI) in a Physical Downlink Control Channel (PDCCH) search space corresponding to a first carrier, wherein a first information field in the first DCI indicates a second carrier; and activating or deactivating the second carrier by the terminal device in response to the first DCI.

According to a second aspect, there is provided a wireless communication method, including detecting, by a terminal device, first DCI in a PDCCH search space corresponding to a second carrier, wherein a first information field in the first DCI indicates to deactivate the second carrier; and deactivating, by the terminal device, the second carrier according to the first DCI.

According to a third aspect, there is provided a wireless communication method, including sending, by a network device, first DCI in a PDCCH search space corresponding to a first carrier, wherein a first information field in the first DCI indicates a second carrier, and the first DCI is for indicating to activate or deactivate the second carrier.

According to a fourth aspect, there is provided a wireless communication method, including detecting, by a network device, first DCI in a PDCCH search space corresponding to a second carrier, wherein a first information field in the first DCI indicates to deactivate the second carrier.

According to a fifth aspect, there is provided a terminal device configured to perform the method according to the first aspect or any implementation of the first aspect.

Specifically, the terminal device includes functional modules configured to perform the method according to the first aspect or any implementation of the first aspect.

According to a sixth aspect, there is provided a terminal device configured to perform the method according to the second aspect or any implementation of the second aspect.

Specifically, the terminal device includes functional modules configured to perform the method according to the second aspect or any implementation of the second aspect.

According to a seventh aspect, there is provided a network device configured to perform the method according to the third aspect or any implementation of the third aspect.

Specifically, the network device includes functional modules configured to perform the method according to the third aspect or any implementation of the third aspect.

According to an eighth aspect, there is provided a network device configured to perform the method according to the fourth aspect or any implementation of the fourth aspect.

Specifically, the network device includes functional modules configured to perform the method according to the fourth aspect or any implementation of the fourth aspect.

According to a ninth aspect, there is provided a terminal device, including a processor and a memory. The memory is configured to store a computer program, and the processor is configured to call and run the computer program stored in the memory to perform the method according to the first aspect or any implementation of the first aspect.

According to a tenth aspect, there is provided a terminal device, including a processor and a memory. The memory is configured to store a computer program, and the processor is configured to call and run the computer program stored in the memory to perform the method according to the second aspect or any implementation of the second aspect.

According to an eleventh aspect, there is provided a network device, including a processor and a memory. The memory is configured to store a computer program, and the processor is configured to call and run the computer program stored in the memory to perform the method according to the third aspect or any implementation of the third aspect.

According to a twelfth aspect, there is provided a network device, including a processor and a memory. The memory is configured to store a computer program, and the processor is configured to call and run the computer program stored in the memory to perform the method according to the fourth aspect or any implementation of the fourth aspect.

According to a thirteenth aspect, there is provided a chip configured to implement the method according to any one of the first to fourth aspects or any implementation of the first to fourth aspects.

Specifically, the chip includes a processor configured to call and run a computer program stored in a memory to cause a device in which the chip is installed to perform the method according to any one of the first to fourth aspects or any implementation of the first to fourth aspects.

According to a fourteenth aspect, there is provided a computer-readable storage medium configured to store a computer program, wherein the computer program is configured to cause a computer to perform the method according to any one of the first to fourth aspects or any implementation of the first to fourth aspects.

According to a fifteenth aspect, there is provided a computer program product including computer program instructions that cause a computer to perform the method according to any one of the first to fourth aspects or any implementation of the first to fourth aspects.

According to a sixteenth aspect, there is provided a computer program. When the computer program is run on a computer, the computer is caused to perform the method according to any one of the first to fourth aspects or any implementation of the first to fourth aspects.

DETAILED DESCRIPTION

Technical solutions in implementations of the present disclosure will be described below with reference to drawings. Obviously, the described implementations are a part of the implementations of the present disclosure, not all of the implementations. Based on the implementations described herein, all other implementations obtained by those of ordinary skill in the art without creative work are within the scope of protection of the present disclosure.

Implementations of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), next-generation communication system or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), and Vehicle to Vehicle (V2V) communications, etc. Implementations of the present disclosure can be applied to these communications systems.

The communication systems in implementations of the present disclosure can be applied to a Carrier Aggregation (CA) scenario, can also be applied to a Dual Connectivity (DC) scenario, and can also be applied to a standalone (SA) network deployment scenario.

The spectrum which implementations of the present disclosure can be applied in is not limited. For example, implementations of the present disclosure may be applied to licensed spectrum or unlicensed spectrum.

Figure 1:
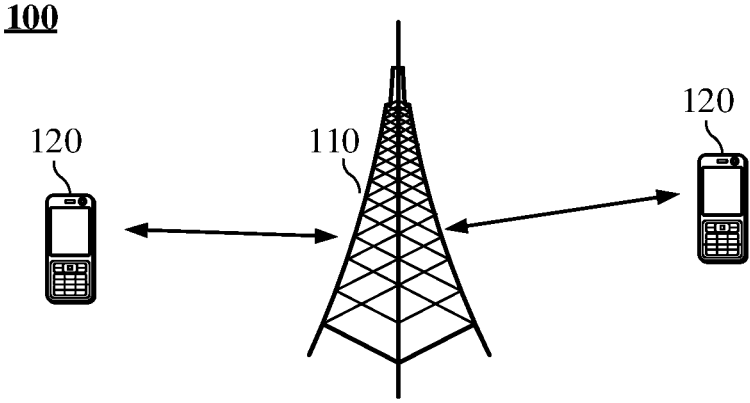
FIG. 1 is a schematic diagram of communication system architecture according to an implementation of the present disclosure.

As an example, a communication system 100 applied in implementations of the present disclosure is shown in FIG. 1. The communication system 100 may include a network device 110, and the network device 110 may be a device that communicates with a terminal device 120 (or called a communication terminal or a terminal). The network device 110 may provide communication coverage for a specific geographic area and may communicate with terminal devices in the coverage area.

FIG. 1 illustratively shows one network device and two terminal devices. According to other implementations, the communication system 100 may include multiple network devices and the coverage of each network device may include other numbers of terminal devices, and implementations of the present disclosure do not impose specific limitations on this.

According to some implementations, the communication system 100 may also include other network entities such as a network controller or a mobility management entity, and implementations of the present disclosure do not impose specific limitations on this.

It should be understood that the devices with communication functions in the network/system in the implementations of the present disclosure may be referred to as communication devices. Taking the communication system 100 shown in FIG. 1 as an example, the communication devices may include the network device 110 and the terminal devices 120 which have communication functions. The network device 110 and the terminal devices 120 may be the specific devices described above, which will not be repeated here. The communication devices may also include other devices in the communication system 100, such as a network controller, a mobility management entity and other network entities, and implementations of the present disclosure do not impose specific limitations on this.

Implementations of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc. The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

By way of example and not limitation, in implementations of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions and need to cooperate with other devices like smart phones, such as smart bracelets for sign monitoring, or smart jewelry.

The network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB,), or a relay station or an access point, or a vehicle-mounted device, a wearable device, a network device (gNB) in an NR network, or a network device in future evolved PLMN network.

In implementations of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include a metro cell, a micro cell, a pico cell, a femto cell, etc. These small cells have the characteristics of small coverage and low transmit power and are suitable for providing high-speed data transmission services.

It should be understood that in a carrier aggregation system, each component carrier has an independent PDCCH Search Space. In the carrier aggregation system, two scheduling methods are supported self-scheduling (or own scheduling) and cross-carrier scheduling. In the self-scheduling, for downlink data transmission, a Physical Downlink Shared Channel (PDSCH) is transmitted on a target downlink carrier, and a PDCCH search space carrying corresponding DCI is transmitted on the target downlink carrier; for uplink data transmission, the PUSCH is transmitted on a target uplink carrier, and the PDCCH search space carrying corresponding DCI is transmitted on a downlink carrier paired with the target uplink carrier. In the cross-carrier scheduling, for downlink data transmission, the PDCCH search space and the corresponding PDSCH are transmitted on different carriers; for uplink data transmission, the PDCCH search space is not transmitted on the downlink carrier paired with the uplink carrier where the corresponding Physical Uplink Shared Channel (PUSCH) is located. In the cross-carrier scheduling, the DCI contains a carrier indicator information field. The carrier indicator information field is for indicating the index number of the transmission carrier for the PDSCH or PUSCH scheduled by the DCI. In the self-scheduling, the DCI does not include the carrier indicator information field.

It should be noted that implementations of the present disclosure can be applied to the self-scheduling or can be applied to the cross-carrier scheduling.

The Carrier Aggregation (CA) technology can enable a terminal device to use multiple component carriers to send and receive data at the same time, which increases the data transmission rate and improves system working efficiency. In the CA system, activation and deactivation of a carrier can be achieved through Media Access Control Control Element (MAC CE) signaling or based on timer control. However, in the carrier activation and deactivation method based on the MAC CE mode or the timer control, the signaling takes effect with a certain delay. For example, in the LTE technology, when a terminal device receives an activation command for a Secondary Cell (SCell) in a subframe n, starting of various operations on a corresponding carrier is completed not later than subframe n+8 (including the subframe n+8); when the terminal device receives a deactivation command or the deactivation timer for a certain SCell expires in subframe n, various operations on the corresponding carrier are stopped not later than subframe n+8 (including the subframe n+8).

For the fifth-generation mobile communication (5G) system, due to the large bandwidth of the component carriers (for example, a frequency band less than 6 GHz can support a maximum component carrier bandwidth of 80 MHz, and a frequency band greater than 6 GHz can support a maximum component carrier bandwidth of 400 MHz), when implementing the carrier aggregation technology, a data packet can be transmitted instantly in a short time. Moreover, the services of terminal device also have transient characteristics that sometimes disappear. Aiming at the above problems, implementations of the present disclosure provide a carrier activation or deactivation method, which can quickly activate or deactivate a carrier when the terminal device uses the CA technology, which is beneficial to reducing the power consumption of the terminal device.

Figure 2:
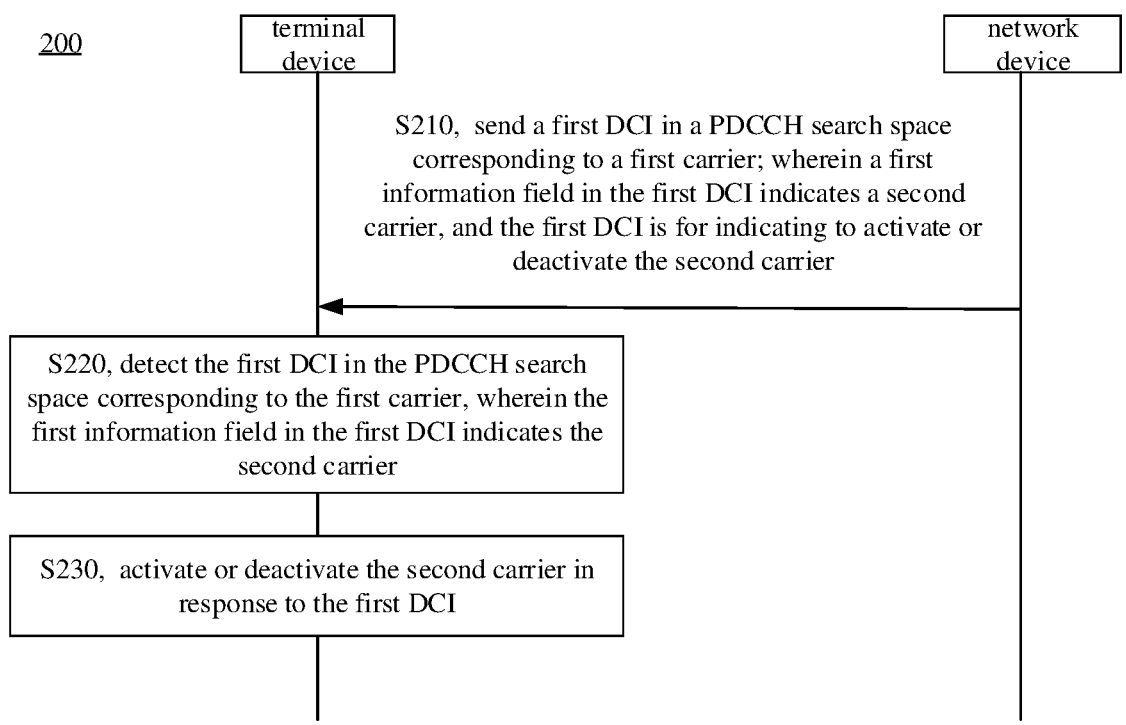
FIG. 2 is a schematic flowchart of a wireless communication method according to an implementation of the present disclosure.

FIG. 2 is a schematic flowchart of a wireless communication method 200 according to an implementation of the present disclosure. As shown in FIG. 2, the method 200 may include the following operations.

In S210, a network device sends a first DCI in a PDCCH search space corresponding to a first carrier. A first information field in the first DCI indicates a second carrier, and the first DCI is for indicating to activate or deactivate the second carrier.

In S220, a terminal device detects the first DCI in the PDCCH search space corresponding to the first carrier. The first information field in the first DCI indicates the second carrier.

In S230, in response to the first DCI, the terminal device activates or deactivates the second carrier.

According to some implementations, the first carrier may be a Primary Cell (PCell) carrier, and the second carrier may be a Secondary Cell (SCell) carrier.

According to some implementations, the first information field may be a carrier indicator information field, and the first information field indicates the second carrier. According to some other implementations, the first information field may indicate activation or deactivation of the second carrier by other information.

In implementations of the present disclosure, the PDCCH search space corresponding to a carrier may also be the PDCCH corresponding to the carrier. That is, the network device may send DCI on the PDCCH corresponding to the carrier, and the terminal device may detect the DCI on the PDCCH corresponding to the carrier.

According to some implementations, if the terminal device activates the second carrier in S230, the second carrier is in a deactivated state before the terminal device receives the first DCI. In other words, in S210, when the second carrier is in the deactivated state, the network device determines that the second carrier needs to be activated, and the network device sends the first DCI to indicate to activate the second carrier. Similarly, if the terminal device deactivates the second carrier in S230, the second carrier is in an activated state before the terminal device receives the first DCI. In other words, in S210, when the second carrier is in the activated state, the network device determines that the second carrier needs to be deactivated, and the network device sends the first DCI to indicate to deactivate the second carrier.

The implementations may be as follows. If the second carrier is in the deactivated state before the first DCI is received, the first information field in the first DCI indicates to activate the second carrier, and the terminal device activates the second carrier according to the first DCI. If the second carrier is in the activated state before the first DCI is received, the first information field in the first DCI indicates to deactivate the second carrier, and the terminal device deactivates the second carrier according to the first DCI.

In implementations of the present disclosure, the bit length of each information field in the first DCI satisfies a restriction required by the first carrier. That is, the bit length of each information field in the DCI transmitted on a certain carrier is restricted by this carrier.

In implementations of the present disclosure, the first DCI is for scheduling a transmission of a PDSCH on the second carrier, or the first DCI is for scheduling a transmission of a PUSCH on the second carrier. For example, in response to the first DCI, the terminal device activates the second carrier. Under such condition, the first DCI is for scheduling a transmission of PDSCH or PUSCH on the second carrier.

According to some implementations, in a case where the first DCI is for scheduling a transmission of PDSCH or PUSCH on the second carrier, the value of each information field in the first DCI satisfies a restriction required by the second carrier. For example, when parameters of the first carrier and the second carrier (such as bandwidth, subcarrier spacing, maximum number of ranks, HARQ timing, antenna port configuration, sounding reference signal (SRS) configuration, etc.) are different, the bit length of each information field in the first DCI satisfies the restriction required by the first carrier, but the value of each information field in the first DCI satisfies the restriction required by the second carrier.

For example, the bandwidth of the first carrier is 20 MHz, and the bandwidth of the second carrier is 10 MHz. The frequency domain resource assignment information field in the first DCI is set based on 20 MHz, but the actual transmission bandwidth for the scheduled PDSCH or PUSCH cannot be greater than 10 MHz. Similarly, other information fields in the first DCI satisfy similar restrictions.

For another example, the bit length of an information field M is determined to be A based on the parameters of the first carrier, and the bit length of the information field M is determined to be B based on the parameters of the second carrier. When A is greater than or equal to B, the parameters of the PDSCH or PUSCH transmitted on the second carrier are determined according to first B bits or the last B bits in the information field M. For example, the information field M is an antenna port(s) information field, the length of the antenna port(s) information field is determined to be 6 bits according to the parameters of the first carrier, and the length of the antenna port(s) information field is determined to be 4 bits according to the parameters of the second carrier. The terminal device may determine the antenna port configuration of the PDSCH transmitted on carrier 2 according to the indication of the first 4 bits in the antenna port(s) information field (6 bits) in the first DCI. The last 2 bits are invalid bits or configured as placeholder information.

For another example, the bit length of an information field N is determined to be A based on the parameters of the first carrier, and the bit length of the information field N is determined to be B based on the parameters of the second carrier. When A is less than B, the indication range of the information field N in the first DCI is a subset of the indication range of the information field N corresponding to the second carrier. For example, the information field N is the antenna port(s) information field, the length of the antenna port(s) information field is determined to be 4 bits according to the parameters of the first carrier, and the length of the antenna port(s) information field is determined to be 6 bits according to the parameters of the second carrier. The terminal device can indicate 16 states according to the antenna port(s) information field (4 bits) in the first DCI, which is the first 16 or the last 16 of the 32 states corresponding to carrier 2.

It should be noted that individual information fields in the first DCI may include an Identifier for DCI formats information field, a carrier indicator information field, a uplink (UL) or supplementary uplink (SUL) indicator (UL/SUL indicator) information field, a Bandwidth part (BWP) indicator information field, a frequency domain resource assignment information field, a time domain resource assignment information field, a frequency hopping flag information field, a modulation and coding scheme information field, a new data indicator information field, a redundancy version information field, a Hybrid Automatic Repeat reQuest (HARQ) process number information field, a first downlink assignment index information field, a second downlink assignment index information field, a precoding information and number of layers information field, an antenna ports information field, an SRS request information field, a code block group (CBG) transmission information field, a zero power Channel State Information Reference Signal (CSI-RS) trigger information field, and so on.

In implementations of the present disclosure, after activating the second carrier, the terminal device detects a second DCI on a PDCCH search space corresponding to the second carrier, and the second DCI is for scheduling a transmission of a PDSCH on the second carrier or a transmission of a PUSCH on the second carrier.

In implementations of the present disclosure, the PDCCH search space corresponding to the first carrier and the PDCCH search space corresponding to the second carrier are independently configured.

That is to say, in implementations of the present disclosure, the DCI for scheduling a transmission of the PDSCH on the second carrier or a transmission of the PUSCH on the second carrier may be transmitted on the first carrier or may be transmitted on the second carrier.

In implementations of the present disclosure, the first DCI includes a second information field, wherein the second information field is configured as reserved information or placeholder information; or the second information field is for indicating a second carrier configuration parameter.

For example, when the second information field is configured as reserved information or placeholder information, the terminal device no longer needs to read the second information field, thereby avoiding the signaling overhead caused by reading some unnecessary information fields.

For another example, the second information field is for indicating a configuration parameter of the second carrier. For example, the second information field is for indicating PDCCH Control resource Set (CORESET) configuration, PDCCH search space configuration, BWP configuration, bandwidth, subcarrier spacing, time domain resource configuration, measurement signal configuration, maximum rank number, antenna port(s) configuration, HARQ process, HARQ timing, etc. In this case, the second information field needs to be read to obtain the configuration parameters of the second carrier.

In implementations of the present disclosure, the first DCI is detected in a slot n, and the terminal device immediately activates the second carrier after completing the demodulation of the first DCI.

In implementations of the present disclosure, if the first DCI is detected in the slot n, the terminal device activates or deactivates the second carrier in a slot n+k, where n and k are non-negative integers. Alternatively, the network device indicates the terminal device to activate or deactivate the second carrier in the slot n+k, where n and k are non-negative integers. The slot n is a slot in which the first DCI is detected (or found) by the terminal device.

According to some implementations, the k is pre-configured, or the k is indicated by the first DCI.

For example, k is an agreed value, preferably k=1.

For example, the time domain resource assignment information field in the first DCI indicates the k.

For another example, when the first DCI schedules the PDSCH or PUSCH, the slot n+k is the slot for transmitting the scheduled PDSCH/PUSCH.

In implementations of the present disclosure, the first DCI is scrambled by a first Radio Network Temporary Identifier (RNTI), and the first RNTI is for indicating activation or deactivation of the second carrier. The first RNTI is, for example, a Configured Scheduling RNTI (CS-RNTI) or a Cell RNTI (C-RNTI).

Figure 3:
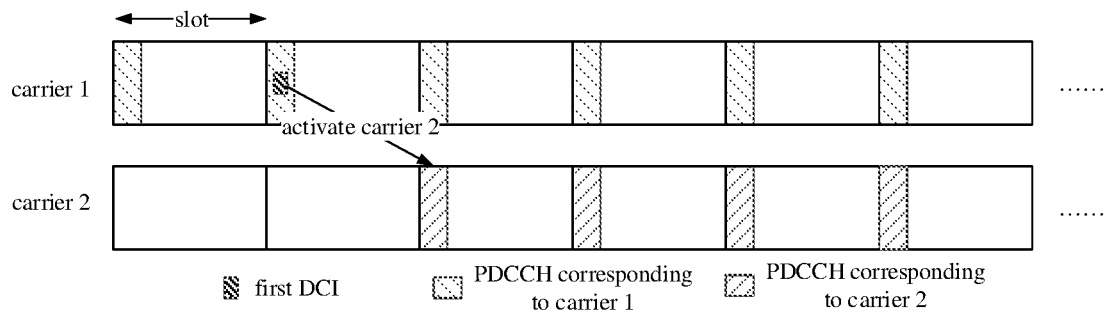
FIG. 3 is a schematic diagram of carrier activation according to an implementation of the present disclosure.

According to an implementation, the method can be applied to a carrier aggregation system, and the self-scheduling mode is used. Specifically, as shown in FIG. 3, in the implementation, the first DCI is detected in the PDCCH corresponding to carrier 1 (preferably the PCell carrier), and the carrier indicator information field in the first DCI indicates carrier 2, and then carrier 2 is activated. Starting from the activation time of carrier 2, the terminal device monitors the second DCI in the PDCCH corresponding to carrier 2. The second DCI is for scheduling a transmission of the PDSCH on carrier 2 or a transmission of the PUSCH on carrier 2. The second DCI may not include the carrier indicator information field. The terminal device first only monitors the PDCCH corresponding to carrier 1. When it is determined that carrier 2 is to be activated according to the first DCI in the PDCCH corresponding to carrier 1, the terminal device starts to monitor the PDCCH corresponding to carrier 2 and starts the measurement related workflow.

It should be noted that, in this implementation, when the terminal device performs DCI blind detection on the PDCCH corresponding to carrier 1, if the terminal device detects DCI transmitted on carrier 1, the detection cannot be stopped immediately, and the terminal device needs to continue to detect whether the first DCI exists, and the duration of the continuous detection is limited by the maximum number of blind detections.

Therefore, in this implementation, on the premise of not increasing the maximum number of DCI blind detections, carrier activation is dynamically indicated, thereby avoiding unnecessary PDCCH monitoring and measurement for carrier 2 by the terminal device, and accordingly reducing terminal power consumption.

Figure 4:
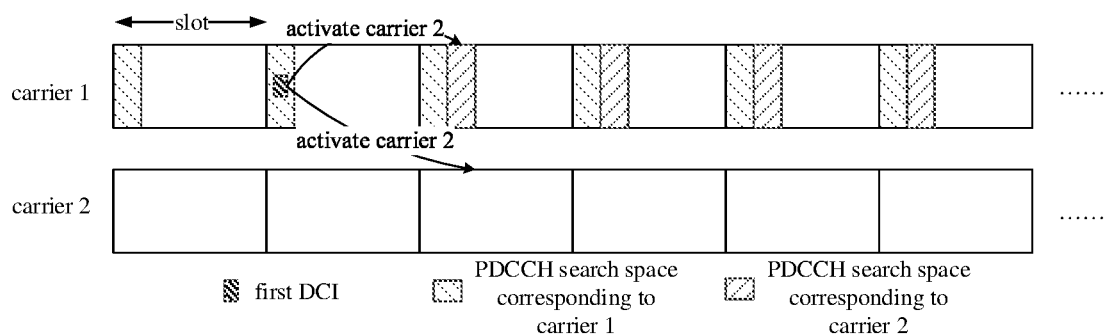
FIG. 4 is a schematic diagram of carrier activation according to an implementation of the present disclosure.

According to an implementation, the method can be applied to a carrier aggregation system, and the cross-carrier scheduling mode is used. Specifically, as shown in FIG. 4, in this implementation, if the first DCI is detected in the PDCCH search space corresponding to carrier 1 and the carrier indicator information field in the first DCI indicates carrier 2, then the terminal device activates carrier 2. Starting from the activation time of carrier 2, the terminal device detects the second DCI in the PDCCH search space corresponding to carrier 2, and the second DCI is for scheduling a transmission of the PDSCH on carrier 2 or a transmission of the PUSCH on carrier 2. With the cross-carrier scheduling, the PDCCH search space corresponding to carrier 2 may be transmitted by carrier 1 (or the PDCCH search space corresponding to carrier 2 is configured on carrier 1), but the PDCCH search space corresponding to carrier 1 is independently configured. After carrier 2 is activated, the terminal needs to perform more frequent PDCCH monitoring or perform more PDCCH blind detection in a slot. The terminal device first monitors only the PDCCH search space corresponding to carrier 1. When activation of carrier 2 is determined according to the first DCI in the PDCCH search space corresponding to carrier 1, the terminal device starts to monitor the PDCCH search space corresponding to carrier 2 and starts the measurement related workflow.

It should be noted that, in this implementation, when the terminal device performs DCI blind detection on the PDCCH corresponding to carrier 1, if the DCI for scheduling transmissions on the carrier 1 is detected by the terminal device, the detection cannot be stopped immediately, and the terminal device needs to continue to detect whether the first DCI exists, and the duration of the continuous detection is limited by the maximum number of blind detections.

Therefore, in this implementation, on the premise of not increasing the DCI blind detections, dynamic carrier activation is supported, thereby avoiding unnecessary PDCCH search space monitoring and measurement for carrier 2 by the terminal device, and accordingly reducing terminal power consumption.

Figure 5:
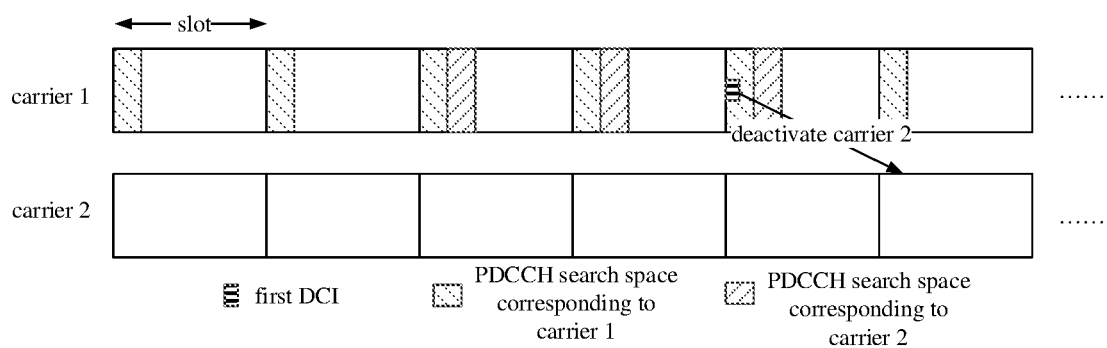
FIG. 5 is a schematic diagram of carrier deactivation according to an implementation of the present disclosure.
Figure 6:
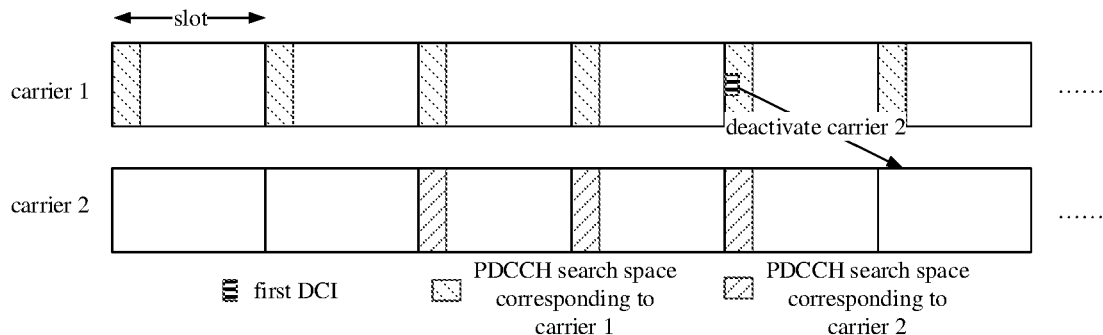
FIG. 6 is a schematic diagram of carrier deactivation according to an implementation of the present disclosure.

According to an implementation, the method can be applied to a carrier aggregation system, and the cross-carrier scheduling mode may be used (as shown in FIG. 5), or the self-scheduling mode may be used (as shown in FIG. 6). Specifically, in this implementation, when carrier 2 is activated, the first DCI is sent in the PDCCH search space (or PDCCH) corresponding to carrier 1, and the carrier indicator information field in the first DCI indicates carrier 2. In response to the first DCI, the terminal device determines to deactivate carrier 2. Each information field in the first DCI is determined based on the parameters of carrier 1. Further, the value of a predetermined information field in the first DCI is set to a predetermined value, and the first DCI is determined as deactivation signaling. One of the purposes of setting the predetermined information field as the predetermined value is to distinguish from activation signaling. In addition, since carrier 2 itself needs to be deactivated, that is, no data transmission is required, it is of little significance to use the first DCI to schedule transmissions of PDSCH or PUSCH, and the PDSCH or PUSCH transmission parameter information field can be set to an invalid value. For example, the frequency domain resource assignment information field and/or the modulation and coding scheme information field and/or the HARQ process number and/or the downlink assignment index or other information fields are set to all zeros. After the terminal device determines to deactivate carrier 2 according to the first DCI, the terminal device no longer monitors the PDCCH search space (or PDCCH) corresponding to carrier 2 and stops the measurement related workflow.

It should be noted that, in this implementation, when the terminal device performs DCI blind detection on the PDCCH corresponding to carrier 1, if the DCI for scheduling transmissions on the carrier 1 is detected by the terminal device, detection cannot be stopped immediately, and the terminal device needs to continue to detect whether the first DCI exists, and the duration of the continuous detection is limited by the maximum number of blind detections.

Therefore, in this implementation, on the premise of not increasing the DCI blind detections (i.e., no new DCI format is introduced), dynamic carrier activation is supported, thereby avoiding unnecessary PDCCH search space monitoring and measurement for carrier 2 by the terminal device, and accordingly reducing terminal power consumption.

In view of the above, in implementations of the present disclosure, the terminal device can activate or deactivate the second carrier according to the first information field in the first DCI. Thus, implementations of the present disclosure can dynamically perform carrier activation or deactivation, thereby reducing the time delay for carrier activation and deactivation to take effect while avoiding unnecessary PDCCH monitoring and measurement by the terminal device, and accordingly reducing power consumption.

Figure 7:
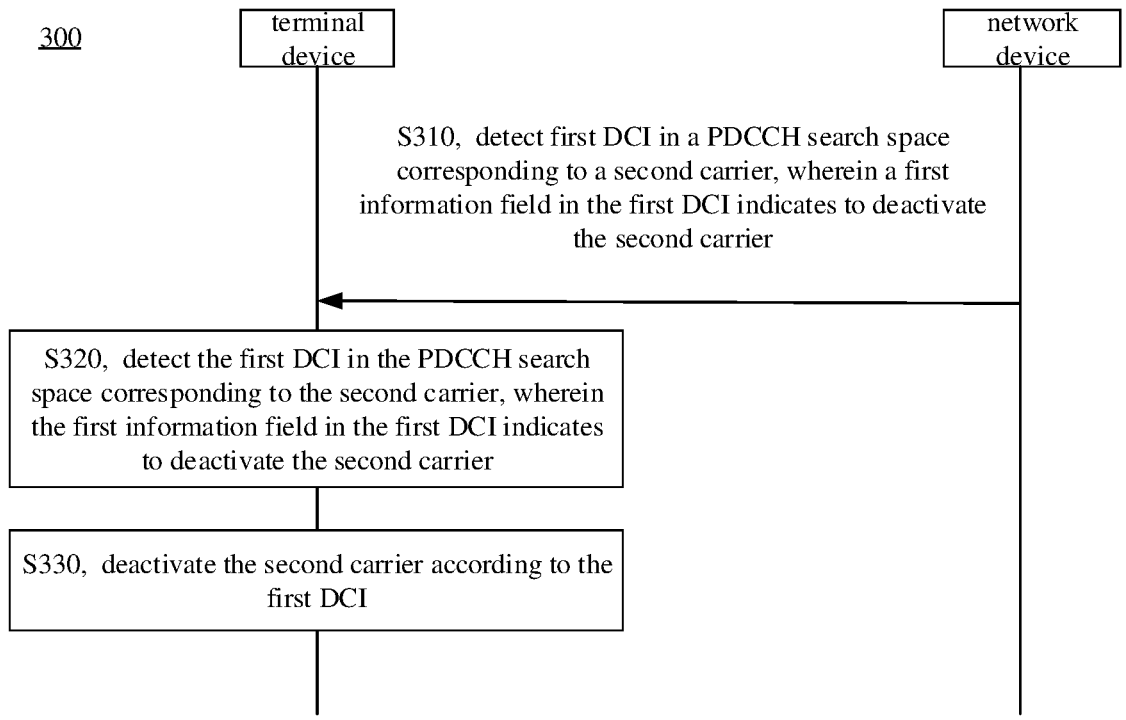
FIG. 7 is a schematic flowchart of another wireless communication method according to an implementation of the present disclosure.

FIG. 7 is a schematic flowchart of a wireless communication method 300 according to an implementation of the present disclosure. As shown in FIG. 7, the method 300 may include the following operations.

In S310, a network device detects first DCI in a PDCCH search space corresponding to a second carrier. A first information field in the first DCI indicates to deactivate the second carrier.

In S320, a terminal device detects the first DCI in the PDCCH search space corresponding to the second carrier. The first information field in the first DCI indicates to deactivate the second carrier.

In S330, the terminal device deactivates the second carrier according to the first DCI.

In implementations of the present disclosure, if the second carrier is in an activated state before the first DCI is received, the first information field in the first DCI indicates to deactivate the second carrier, and the terminal device deactivates the second carrier according to the first DCI.

In implementations of the present disclosure, each information field in the first DCI satisfies a restriction required by the second carrier. For example, the bit length and/or value of each information field in the first DCI satisfy the restriction required by the second carrier. That is, each information field in the DCI transmitted on a certain carrier satisfies the restriction required by the carrier.

In implementations of the present disclosure, the first information field is a carrier indicator information field, and the value of the first information field is an agreed value.

For example, the agreed value is a value corresponding to a primary carrier, a value other than a value corresponding to the second carrier, or a value configured by a network device, or a pre-configured value.

In implementations of the present disclosure, the first DCI is for scheduling a transmission of PDSCH on a first carrier or the first DCI is for scheduling a transmission of PUSCH on a first carrier, and the first carrier is a carrier indicated by the first information field.

According to some implementations, in a case where the first DCI is for scheduling a transmission of PDSCH on the first carrier or the first DCI is for scheduling a transmission of PUSCH on the first carrier, the value of each information field in the first DCI satisfies the restriction required by the first carrier. For example, when the parameters of the first carrier and the second carrier (such as bandwidth, subcarrier spacing, maximum number of ranks, HARQ timing, antenna port configuration, SRS configuration, etc.) are different, the bit length of each information field in the first DCI satisfies the restriction required by the second carrier, but the value of each information field in the first DCI satisfies the restriction required by the first carrier.

In implementations of the present disclosure, the first information field is a carrier deactivation information field, and the value of the first information field is configured by the network device or pre-configured. For example, when the value of the first information field is 1, the first information field indicates deactivation.

In implementations of the present disclosure, the first information field is an information field for indicating a Physical Downlink Shared Channel (PDSCH) or a Physical Uplink Shared Channel (PUSCH) parameter, and a value of the first information field is pre-configured or invalid. For example, the frequency domain resource assignment information field and/or the modulation and coding scheme information field and/or the HARQ process number and/or downlink assignment index information field or other information field are set to all zeros (invalid values).

In implementations of the present disclosure, the first DCI is detected in a slot n, and the terminal device immediately deactivates the second carrier after completing demodulation of the first DCI.

In implementations of the present disclosure, if the first DCI is detected in the slot n, the terminal device deactivates the second carrier in a slot n+k, where n and k are non-negative integers.

For example, the k is pre-configured, or the k is indicated by the first DCI.

For example, k is an agreed value, preferably k=1.

For example, the time domain resource assignment information field in the first DCI indicates the k.

In implementations of the present disclosure, the first DCI is scrambled by a first RNTI, and the first RNTI is for indicating to deactivate the second carrier. The first RNTI is, for example, a CS-RNTI or a C-RNTI.

Figure 8:
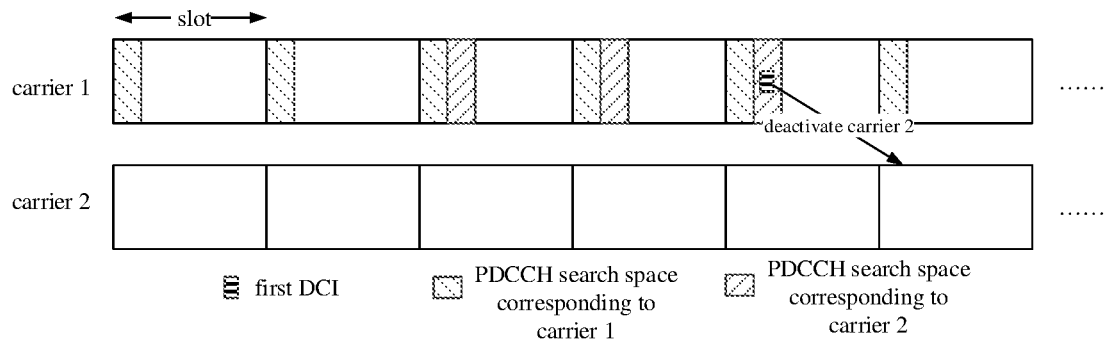
FIG. 8 is a schematic diagram of carrier deactivation according to an implementation of the present disclosure.
Figure 9:
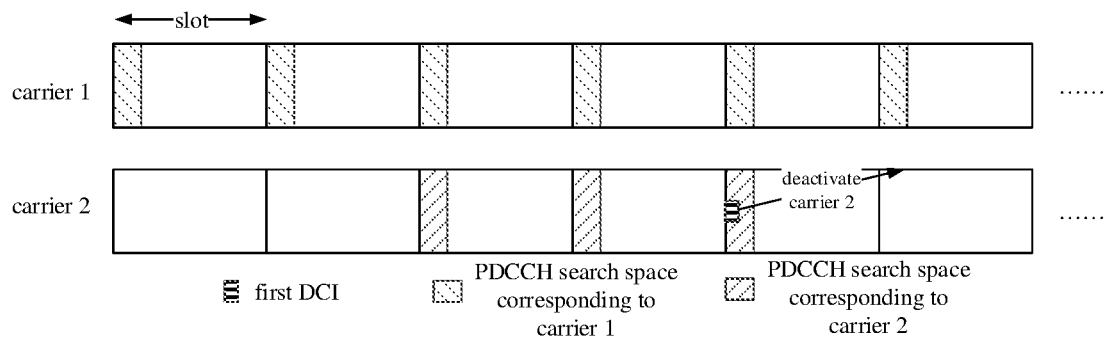
FIG. 9 is a schematic diagram of carrier deactivation according to an implementation of the present disclosure.

According to an implementation, the method can be applied to a carrier aggregation system, and the cross-carrier scheduling mode may be used (as shown in FIG. 8), or the self-scheduling mode may be used (as shown in FIG. 9). Specifically, in this implementation, when carrier 2 is activated, the first DCI is sent in the PDCCH search space (or PDCCH) corresponding to carrier 2, and the carrier indicator information field in the first DCI indicates a predetermined carrier (or not the carrier 2), the terminal device determines that carrier 2 is to be deactivated. Each information field in the first DCI is determined based on the parameters of carrier 2. The first DCI is for scheduling a transmission of the PDSCH on carrier or a transmission of the PUSCH on carrier 1. After the terminal device determines to deactivate carrier 2 according to the first DCI, the terminal no longer monitors the PDCCH search space corresponding to carrier 2 and stops measurement related workflows.

Therefore, in this implementation, on the premise of not increasing the DCI blind detections (i.e., no new DCI format is introduced), dynamic carrier activation is supported, thereby avoiding unnecessary PDCCH search space monitoring and measurement for carrier 2 by the terminal device, and accordingly reducing terminal power consumption.

According to an implementation, the method can be applied to a carrier aggregation system, and the cross-carrier scheduling mode may be used, or the self-scheduling mode may be used. Specifically, in this implementation, when carrier 2 is activated, the first DCI is received in the PDCCH search space (or PDCCH) corresponding to carrier 2, and the first DCI does not include the carrier indicator information field. The first DCI includes a target information field, the value of the target information field is an agreed value, and the terminal device determines that carrier 2 is to be deactivated.

For example, the target information field is a deactivation indication information field, and when the value of the deactivation indication information field is 1, the deactivation indication information field indicates deactivation.

For example, the frequency domain resource assignment information field and/or modulation and coding scheme information field and/or HARQ process number and/or downlink assignment index information field and so on are set to all zeros.

After the terminal device determines to deactivate carrier 2 according to the first DCI, the terminal device no longer monitors the PDCCH search space corresponding to carrier 2 and stops the measurement related workflow.

Therefore, in this implementation, on the premise of not increasing the DCI blind detections (i.e., no new DCI format is introduced), dynamic carrier activation is supported, thereby avoiding unnecessary PDCCH search space monitoring and measurement for carrier 2 by the terminal device, and accordingly reducing terminal power consumption. In addition, the carrier indicator information field (3 bits) is not included in the DCI when self-scheduling is performed, the downlink control signaling overhead is low.

It should be understood that details regarding the steps in the wireless communication method 300 can be found in the previous description regarding corresponding steps in the wireless communication method 200. For example, related descriptions of the first DCI, or deactivation time, or the like can be found in the previous description regarding the wireless communication method 200. For brevity, repeated description is omitted here.

Therefore, in implementations of the present disclosure, the terminal device can deactivate the second carrier according to indication of the first information filed in the first DCI. Thus, implementations of the present disclosure can dynamically perform carrier deactivation, thereby reducing the time delay for carrier deactivation to take effect while avoiding unnecessary PDCCH monitoring and measurement by the terminal device, and accordingly reducing power consumption.

Figure 10:
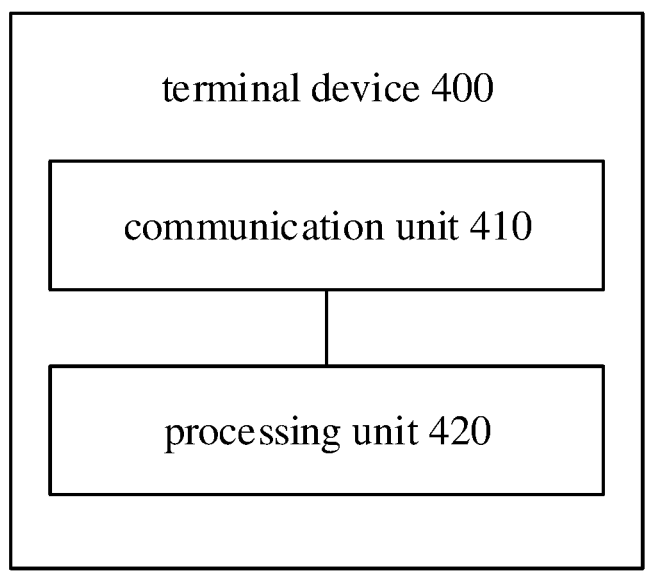
FIG. 10 is a schematic block diagram of a terminal device according to an implementation of the present disclosure.

FIG. 10 is a schematic block diagram of a terminal device 400 according to an implementation of the present disclosure. As shown in FIG. 10, the terminal device 400 includes a communication unit 410 and a processing unit 420.

The communication unit 410 is configured to detect first Downlink Control Information (DCI) in a Physical Downlink Control Channel (PDCCH) search space corresponding to a first carrier. A first information field in the first DCI indicates a second carrier.

The processing unit 420 is configured to, in response to the first DCI, activate or deactivate the second carrier.

According to implementations, if the second carrier is in a deactivated state before the communication unit 410 receives the first DCI, the first information field in the first DCI indicates to activate the second carrier by, and the processing unit 420 is configured to activate the second carrier according to the first DCI; or if the second carrier is in an activated state before the communication unit 410 receives the first DCI, the first information field in the first DCI indicates to deactivate the second carrier, and the processing unit 420 is configured to deactivate the second carrier according to the first DCI.

According to implementations, a bit length of each information field in the first DCI satisfies a restriction required by the first carrier.

According to implementations, the first DCI is for scheduling a transmission of a Physical Downlink Shared Channel (PDSCH) on the second carrier, or the first DCI is for scheduling a transmission of a Physical Uplink Shared Channel (PUSCH) on the second carrier.

According to implementations, a value of each information field in the first DCI satisfies a restriction required by the second carrier.

According to implementations, after the processing unit 420 activates the second carrier, the communication unit 410 is further configured to detect a second DCI in a PDCCH search space corresponding to the second carrier. The second DCI is for scheduling a transmission of a PDSCH on the second carrier or a transmission of a PUSCH on the second carrier.

According to implementations, the PDCCH search space corresponding to the first carrier and the PDCCH search space corresponding to the second carrier are independently configured.

According to implementations, the first DCI includes a second information field; the second information field is configured as reserved information or placeholder information; or the second information field is for indicating a second carrier configuration parameter.

According to implementations, the processing unit 420 is configured to if the first DCI is detected by the terminal device in a slot n, activate or deactivate the second carrier in a slot n+k, wherein n and k are non-negative integers.

According to implementations, the k is pre-configured, or the k is indicated by the first DCI.

According to implementations, a time domain resource assignment information field in the first DCI indicates the k.

According to implementations, the first DCI is scrambled by a first RNTI, and the first RNTI is for indicating activation or deactivation of the second carrier.

According to implementations, the first information field is a carrier indicator information field.

It should be understood that the terminal device 400 according to implementations of the present disclosure may correspond to the terminal device in the method implementations of the present disclosure, and the above and other operations and/or functions of each unit in the terminal device 400 are used to implement corresponding processes performed by the terminal device in the method 200 shown in FIG. 2. For the sake of brevity, repeated descriptions are omitted here.

Figure 11:
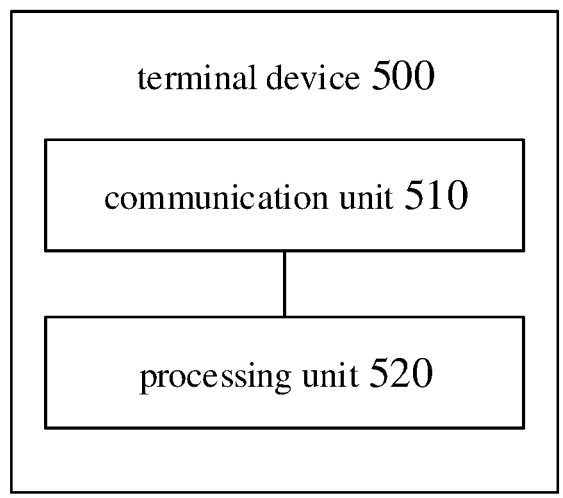
FIG. 11 is a schematic block diagram of another terminal device according to an implementation of the present disclosure.

FIG. 11 is a schematic block diagram of another terminal device 500 according to an implementation of the present disclosure. As shown in FIG. 11, the terminal device 500 includes a communication unit 510 and a processing unit 520.

The communication unit 510 is configured to detect first Downlink Control Information (DCI) in a Physical Downlink Control Channel (PDCCH) search space corresponding to a second carrier. A first information field in the first DCI indicates to deactivate the second carrier.

The processing unit 520 is configured to deactivate the second carrier according to the first DCI.

According to implementations, if the second carrier is in an activated state before the communication unit 510 receives the first DCI, the first information field in the first DCI indicates to deactivate the second carrier, and the processing unit 520 is configured to deactivate the second carrier according to the first DCI.

According to implementations, each information field in the first DCI satisfies a restriction required by the second carrier.

According to implementations, the first information field is a carrier indicator information field, and a value of the first information field is an agreed value.

According to implementations, the agreed value is a value corresponding to a primary carrier, or a value other than a value corresponding to the second carrier, or a value configured by a network device, or a pre-configured value.

According to implementations, the first DCI is for scheduling a transmission of a PDSCH on a first carrier, or the first DCI is for scheduling a transmission of a PUSCH on a first carrier, and the first carrier is a carrier indicated by the first information field.

According to implementations, a value of each information field in the first DCI satisfies a restriction required by the first carrier.

According to implementations, the first information field is a carrier deactivation information field, and a value of the first information field is configured by a network device or is pre-configured.

According to implementations, the first information field is an information field for indicating a Physical Downlink Shared Channel (PDSCH) or a Physical Uplink Shared Channel (PUSCH) parameter, and a value of the first information field is pre-configured or invalid.

According to implementations, the processing unit 520 is configured to if the first DCI is detected by the terminal device in a slot n, deactivate the second carrier in a slot n+k, wherein n and k are non-negative integers.

According to implementations, the k is pre-configured, or the k is indicated by the first DCI.

According to implementations, a time domain resource assignment information field in the first DCI indicates the k.

According to implementations, the first DCI is scrambled by a first RNTI, and the first RNTI is for indicating to deactivate the second carrier.

It should be understood that the terminal device 500 according to implementations of the present disclosure may correspond to the terminal device in the method implementations of the present disclosure, and the above and other operations and/or functions of each unit in the terminal device 500 are used to implement corresponding processes performed by the terminal device in the method 300 shown in FIG. 7. For the sake of brevity, repeated descriptions are omitted here.

Figure 12:
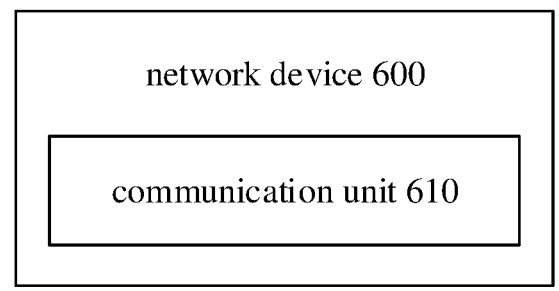
FIG. 12 is a schematic block diagram of a network device according to an implementation of the present disclosure.

FIG. 12 is a schematic block diagram of a network device 600 according to an implementation of the present disclosure. As shown in FIG. 12, the network device 600 includes a communication unit 610.

The communication unit 610 is configured to send first Downlink Control Information (DCI) in a Physical Downlink Control Channel (PDCCH) search space corresponding to a first carrier. A first information field in the first DCI indicates a second carrier, and the first DCI is for indicating to activate or deactivate the second carrier.

According to implementations, if the second carrier is in a deactivated state before the communication unit 610 sends the first DCI, the first information field in the first DCI indicates to activate the second carrier; or if the second carrier is in an activated state before the communication unit 610 sends the first DCI, the first information field in the first DCI indicates to deactivate the second carrier.

According to implementations, a bit length of each information field in the first DCI satisfies a restriction required by the first carrier.

According to implementations, the first DCI is for scheduling a transmission of a Physical Downlink Shared Channel (PDSCH) on the second carrier, or the first DCI is for scheduling a transmission of a Physical Uplink Shared Channel (PUSCH) on the second carrier.

According to implementations, a value of each information field in the first DCI satisfies a restriction required by the second carrier.

According to implementations, after the second carrier is activated, the communication unit 610 is further configured to send a second DCI in a PDCCH search space corresponding to the second carrier. The second DCI is for scheduling a transmission of a PDSCH on the second carrier or a transmission of a PUSCH on the second carrier.

According to implementations, the PDCCH search space corresponding to the first carrier and the PDCCH search space corresponding to the second carrier are independently configured.

According to implementations, the first DCI includes a second information field; the second information field is configured as reserved information or placeholder information; or the second information field is for indicating a second carrier configuration parameter.

According to implementations, the network device 600 further includes a processing unit configured to indicate an opposite device to activate or deactivate the second carrier in a slot n+k, wherein n and k are non-negative integers, and a slot n is a slot in which the first DCI is detected by the terminal device.

According to implementations, the k is pre-configured, or the k is indicated by the first DCI.

According to implementations, a time domain resource assignment information field in the first DCI indicates the k.

According to implementations, the first DCI is scrambled by a first RNTI, and the first RNTI is for indicating activation or deactivation of the second carrier.

According to implementations, the first information field is a carrier indicator information field.

It should be understood that the network device 600 according to implementations of the present disclosure may correspond to the network device in the method implementations of the present disclosure, and the above and other operations and/or functions of each unit in the network device 600 are used to implement corresponding processes performed by the network device in the method 200 shown in FIG. 2. For the sake of brevity, repeated descriptions are omitted here.

Figure 13:
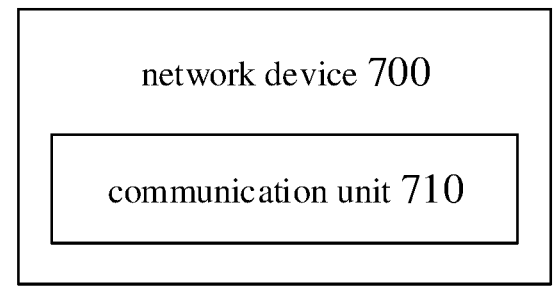
FIG. 13 is a schematic block diagram of another network device according to an implementation of the present disclosure.

FIG. 13 is a schematic block diagram of another network device 700 according to an implementation of the present disclosure. As shown in FIG. 13, the network device 700 includes a communication unit 710.

The communication unit 710 is configured to detect first DCI in a PDCCH search space corresponding to a second carrier. A first information field in the first DCI indicates to deactivate the second carrier.

According to implementations, the second carrier is in an activated state before the communication unit 710 sends first DCI.

According to implementations, each information field in the first DCI satisfies a restriction required by the second carrier.

According to implementations, the first information field is a carrier indicator information field, and a value of the first information field is an agreed value.

According to implementations, the agreed value is a value corresponding to a primary carrier, or a value other than a value corresponding to the second carrier, or a value configured by a network device, or a pre-configured value.

According to implementations, the first DCI is for scheduling a transmission of a PDSCH on a first carrier, or the first DCI is for scheduling a transmission of a PUSCH on a first carrier, and the first carrier is a carrier indicated by the first information field.

According to implementations, a value of each information field in the first DCI satisfies a restriction required by the first carrier.

According to implementations, the first information field is a carrier deactivation information field, and a value of the first information field is configured by a network device or is pre-configured.

According to implementations, the first information field is an information field for indicating a Physical Downlink Shared Channel (PDSCH) or a Physical Uplink Shared Channel (PUSCH) parameter, and a value of the first information field is pre-configured or invalid.

According to implementations, the network device 700 further includes a processing unit configured to indicate an opposite device to deactivate the second carrier in a slot n+k, wherein n and k are non-negative integers, and a slot n is a slot in which the first DCI is detected by the terminal device.

According to implementations, the k is pre-configured, or the k is indicated by the first DCI.

According to implementations, a time domain resource assignment information field in the first DCI indicates the k.

According to implementations, the first DCI is scrambled by a first RNTI, and the first RNTI is for indicating to deactivate the second carrier.

It should be understood that the network device 700 according to implementations of the present disclosure may correspond to the network device in the method implementations of the present disclosure, and the above and other operations and/or functions of each unit in the network device 700 are used to implement corresponding processes performed by the network device in the method 300 shown in FIG. 7. For the sake of brevity, repeated descriptions are omitted here.

Figure 14:
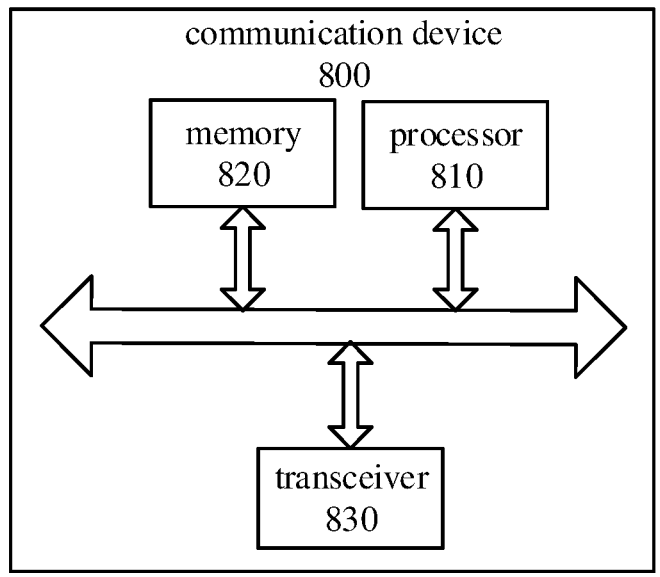
FIG. 14 is a schematic block diagram of a communication device according to an implementation of the present disclosure.

FIG. 14 is a schematic structural diagram of a communication device 800 according to an implementation of the present disclosure. The communication device 800 shown in FIG. 14 includes a processor 810, and the processor 810 may call and run a computer program from a memory to perform the method in implementations of the present disclosure.

According to implementations, as shown in FIG. 14, the communication device 800 may further include a memory 820. The processor 810 may call and run a computer program from the memory 820 to perform the method in implementations of the present disclosure.

The memory 820 may be a separate device independent of the processor 810 or may be integrated in the processor 810.

According to implementations, as shown in FIG. 14, the communication device 800 may further include a transceiver 830, and the processor 810 may control the transceiver 830 to communicate with other devices. Specifically, the transceiver may send information or data to other devices, or receive information or data sent by other devices.

The transceiver 830 may include a transmitter and a receiver. The transceiver 830 may further include one or more antennas.

According to implementations, the communication device 800 may specifically be the network device in implementations of the present disclosure, and the communication device 800 may implement the corresponding processes implemented by the network device in the method implementations of the present disclosure. For brevity, details are not repeated here.

According to implementations, the communication device 800 may specifically be the mobile terminal/terminal device according to an implementation of the present disclosure, and the communication device 800 may implement the corresponding processes implemented by the mobile terminal/terminal device in the method implementations of the present disclosure. For brevity, details are not repeated here.

Figure 15:
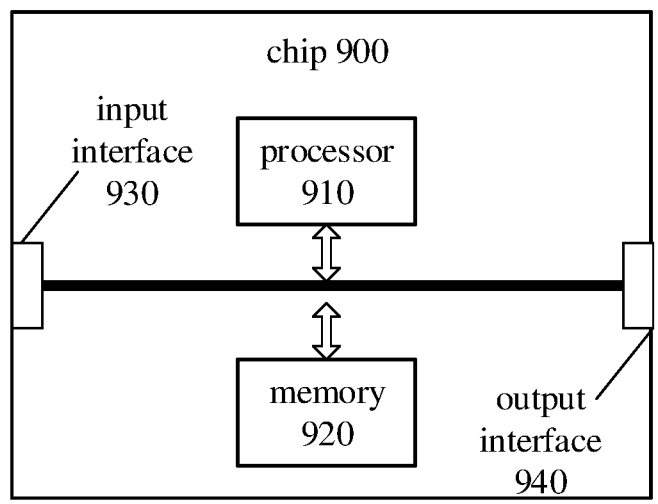
FIG. 15 is a schematic block diagram of a chip according to an implementation of the present disclosure.

FIG. 15 is a schematic structural diagram of a chip according to an implementation of the present disclosure. The chip 900 shown in FIG. 15 includes a processor 910, and the processor 910 can call and run a computer program from a memory to implement the method according to implementations of the present disclosure.

According to implementations, as shown in FIG. 15, the chip 900 may further include a memory 920. The processor 910 may call and run a computer program from the memory 920 to implement the method according to implementations of the present disclosure.

The memory 920 may be a separate device independent of the processor 910 or may be integrated in the processor 910.

According to implementations, the chip 900 may further include an input interface 930. The processor 910 may control the input interface 930 to communicate with other devices or chips, and specifically, the processor 910 can control the input interface to obtain information or data sent by other devices or chips.

According to implementations, the chip 900 may further include an output interface 940. The processor 910 can control the output interface 940 to communicate with other devices or chips, and specifically, the processor 910 can control the output interface 940 to output information or data to other devices or chips.

According to implementations, the chip can be applied to the network device in implementations of the present disclosure, and the chip can implement the corresponding processes implemented by the network device in various methods according to implementations of the present disclosure. For brevity, details are not repeated herein again.

According to implementations, the chip can be applied to the mobile terminal/terminal device in implementations of the present disclosure, and the chip can implement the corresponding processes implemented by the mobile terminal/terminal device in various methods according to implementations of the present disclosure. For brevity, details are not repeated herein again.

It should be understood that the chip in the implementations of the present disclosure may also be referred to as a system-level chip, a system chip, a chip system, or a system-on-chip, etc.

Figure 16:
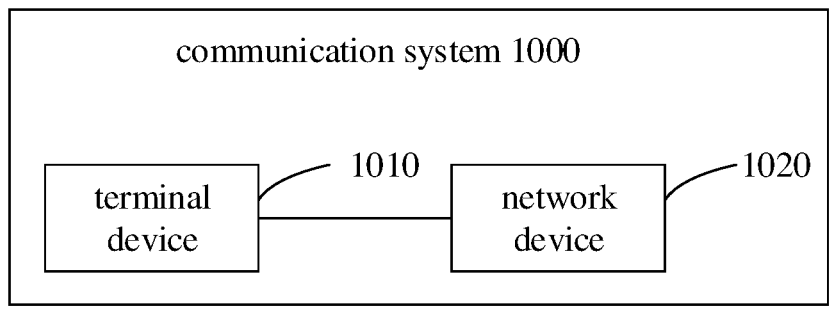
FIG. 16 is a schematic block diagram of a communication system according to an implementation of the present disclosure.

FIG. 16 is a schematic block diagram of a communication system 1000 according to an implementation of the present disclosure. As shown in FIG. 16, the communication system 1000 includes a terminal device 1010 and a network device 1020.

The terminal device 1010 can be used to implement corresponding functions which are implemented by the terminal device in the method implementations, and the network device 1020 can be used to implement corresponding functions which are implemented by the network device in the method implementations. For brevity, details are not repeated herein again.

It should be understood that the processor in implementations of the present disclosure may be an integrated circuit chip with signal processing capability. In implementations, the steps of the foregoing method implementations can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the implementations of the present disclosure can be implemented or executed. The general-purpose processor may be a microprocessor or the processor may also be any conventional processor or the like. The steps of the methods disclosed in the implementations of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the implementations of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in implementations of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in implementations of the present disclosure is intended to include but not limited to these and any other suitable types of memory.

An implementation of the present disclosure further provides a computer-readable storage medium for storing computer programs.

According to implementations, the computer-readable storage medium may be applied to the network device in implementations of the present disclosure, and the computer programs cause a computer to perform the corresponding processes implemented by the network device in each method implementation of the present disclosure. For brevity, repeated descriptions are omitted here.

According to implementations, the computer-readable storage medium may be applied to the mobile terminal/terminal device in implementations of the present disclosure, and the computer programs cause a computer to perform the corresponding processes implemented by the mobile terminal/terminal device in each method implementation of the present disclosure. For brevity, repeated descriptions are omitted here.

An implementation of the present disclosure provides a computer program product, including computer program instructions.

According to implementations, the computer program product may be applied to the network device in implementations of the present disclosure, and the computer program instructions cause a computer to perform the corresponding processes implemented by the network device in each method implementation of the present disclosure. For brevity, repeated descriptions are omitted here.

According to implementations, the computer program product may be applied to the mobile terminal/terminal device in implementations of the present disclosure, and the computer program instructions cause a computer to perform the corresponding processes implemented by the mobile terminal/terminal device in each method implementation of the present disclosure. For brevity, repeated descriptions are omitted here.

An implementation of the present disclosure also provides a computer program.

According to implementations, the computer program may be applied to the network device in implementations of the present disclosure, and when the computer program runs on a computer, the computer is caused to perform the corresponding processes implemented by the network device in each method implementation of the present disclosure. For brevity, repeated descriptions are omitted here.

According to implementations, the computer program may be applied to the mobile terminal/terminal device in implementations of the present disclosure, and when the computer program runs on a computer, the computer is caused to perform the corresponding processes implemented by the mobile terminal/terminal device in each method implementation of the present disclosure. For brevity, repeated descriptions are omitted here.

Those of ordinary skill in the art will appreciate that the exemplary units and algorithm steps described according to implementations disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method implementations.

In the implementations provided in the present disclosure, it should be understood that the disclosed systems, devices and methods may be implemented in other ways. For example, the device implementations described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the implementations.

In addition, the functional units in the implementations of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the implementations of the present disclosure. The foregoing storage medium includes any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary implementations of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
   detecting, by a terminal device, first Downlink Control Information (DCI) in a Physical Downlink Control Channel (PDCCH) search space corresponding to a first carrier, wherein a first information field in the first DCI indicates a second carrier, the first DCI is scrambled by a first Radio Network Temporary Identifier (RNTI), and the first RNTI is for indicating activation or deactivation of the second carrier; and
   activating or deactivating the second carrier by the terminal device in response to the first DCL wherein the first DCI comprises a second information field, the second information field is for indicating a configuration parameter of the second carrier, and the configuration parameter of the second carrier comprises: PDCCH Control resource Set (CORESET) configuration, PDCCH search space configuration, Bandwidth Part (BWP) configuration, bandwidth, subcarrier spacing, time domain resource configuration, measurement signal configuration, maximum rank number, antenna port configuration, Hybrid Automatic Repeat reQuest (HARQ) process, and HARQ timing;
   wherein in a case where a length of the second information field determined according to a configuration parameter of the first carrier is A, a length of the second information field determined according to the configuration parameter of the second carrier is B, and A is greater than or equal to B, first B bits or last B bits in the second information field are used for indicating the configuration parameter of the second carrier;
   wherein in a case where the length of the second information field determined according to the configuration parameter of the first carrier is A, the length of the second information field determined according to the configuration parameter of the second carrier is B, and A is less than B, the configuration parameter of the second carrier indicated by the second information field is a subset of the configuration parameter of the second carrier.

2. The method according to claim 1, wherein activating or deactivating the second carrier by the terminal device comprises:
   in response to that the second carrier is in a deactivated state before the first DCI is received, the first information field in the first DCI indicating to activate the second carrier, and activating, by the terminal device, the second carrier according to the first DCI; or
   in response to that the second carrier is in an activated state before the first DCI is received, the first information field in the first DCI indicating to deactivate the second carrier, and deactivating, by the terminal device, the second carrier according to the first DCI.

3. The method according to claim 1, wherein after activating the second carrier, the method further comprises:
   detecting, by the terminal device, a second DCI in a PDCCH search space corresponding to the second carrier, wherein the second DCI is for scheduling a transmission of a PDSCH on the second carrier or a transmission of a PUSCH on the second carrier.

4. The method according to claim 1, wherein deactivating the second carrier by the terminal device comprises:
   not monitoring the PDCCH search space or PDCCH corresponding to the second carrier.

5. A wireless communication method, comprising:
   sending, by a network device, first Downlink Control Information (DCI) in a Physical Downlink Control Channel (PDCCH) search space corresponding to a first carrier, wherein a first information field in the first DCI indicates a second carrier, the first DCI is scrambled by a first Radio Network Temporary Identifier (RNTI), and the first RNTI is for indicating activation or deactivation of the second carrier;
   wherein the first DCI comprises a second information field, the second information field is for indicating a configuration parameter of the second carrier, and the configuration parameter of the second carrier comprises: PDCCH Control resource Set (CORESET) configuration, PDCCH search space configuration, Bandwidth Part (BWP) configuration, bandwidth, subcarrier spacing, time domain resource configuration, measurement signal configuration, maximum rank number, antenna port configuration, Hybrid Automatic Repeat reQuest (HARQ) process, and HARQ timing;

wherein in a case where a length of the second information field determined according to a configuration parameter of the first carrier is A, a length of the second information field determined according to the configuration parameter of the second carrier is B, and A is greater than or equal to B, first B bits or last B bits in the second information field are used for indicating the configuration parameter of the second carrier;

wherein in a case where the length of the second information field determined according to the configuration parameter of the first carrier is A, the length of the second information field determined according to the configuration parameter of the second carrier is B, and A is less than B, the configuration parameter of the second carrier indicated by the second information field is a subset of the configuration parameter of the second carrier.

6. The method according to claim 5, wherein
if the second carrier is in a deactivated state before the first DCI is sent, the first information field in the first DCI indicates to activate the second carrier; or
if the second carrier is in an activated state before the first DCI is sent, the first information field in the first DCI indicates to deactivate the second carrier.

7. The method according to claim 5,
wherein after activating the second carrier, the method further comprises:
sending, by the network device, a second DCI in a PDCCH search space corresponding to the second carrier, wherein the second DCI is for scheduling a transmission of a PDSCH on the second carrier or a transmission of a PUSCH on the second carrier.

8. A terminal device, comprising:
a memory for storing computer programs; and
a processor;
wherein the processor is configured to execute the computer programs to:
control a transceiver to detect first Downlink Control Information (DCI) in a Physical Downlink Control Channel (PDCCH) search space corresponding to a first carrier, wherein a first information field in the first DCI indicates a second carrier, the first DCI is scrambled by a first Radio Network Temporary Identifier (RNTI), and the first RNTI is for indicating activation or deactivation of the second carrier; and
activate or deactivate the second carrier in response to the first DCI;
wherein the first DCI comprises a second information field, the second information field is for indicating a configuration parameter of the second carrier, and the configuration parameter of the second carrier comprises: PDCCH Control resource Set (CORESET) configuration, PDCCH search space configuration, Bandwidth Part (BWP) configuration, bandwidth, subcarrier spacing, time domain resource configuration, measurement signal configuration, maximum rank number, antenna port configuration, Hybrid Automatic Repeat reQuest (HARQ) process, and HARQ timing;

wherein in a case where a length of the second information field determined according to a configuration parameter of the first carrier is A, a length of the second information field determined according to the configuration parameter of the second carrier is B, and A is greater than or equal to B, first B bits or last B bits in the second information field are used for indicating the configuration parameter of the second carrier;

wherein in a case where the length of the second information field determined according to the configuration parameter of the first carrier is A, the length of the second information field determined according to the configuration parameter of the second carrier is B, and A is less than B, the configuration parameter of the second carrier indicated by the second information field is a subset of the configuration parameter of the second carrier.

9. The terminal device according to claim 8, wherein in response to that the second carrier is in a deactivated state before the first DCI is received, the first information field in the first DCI indicates to activate the second carrier by, and the processor is configured to activate the second carrier according to the first DCI; or
wherein in response to that the second carrier is in an activated state before the first DCI is received, the first information field in the first DCI indicates to deactivate the second carrier, and the processor is configured to deactivate the second carrier according to the first DCI.

10. The terminal device according to claim 8, wherein after the second carrier is activated, the processor is further configured to:
control the transceiver to detect a second DCI in a PDCCH search space corresponding to the second carrier, wherein the second DCI is for scheduling a transmission of a PDSCH on the second carrier or a transmission of a PUSCH on the second carrier.

11. The terminal according to claim 8, wherein the processor is configured to:
not monitor the PDCCH search space or PDCCH corresponding to the second carrier.

* * * * *